(12) United States Patent
Kim

(10) Patent No.: US 12,654,642 B2
(45) Date of Patent: Jun. 16, 2026

(54) BUMPER FRAME FOR VEHICLE AND BUMPER

(71) Applicant: HYUNDAI MOBIS CO., LTD., Seoul (KR)

(72) Inventor: Jae Hyun Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 313 days.

(21) Appl. No.: 18/534,165

(22) Filed: Dec. 8, 2023

(65) Prior Publication Data

US 2024/0317166 A1     Sep. 26, 2024

(30) Foreign Application Priority Data

Mar. 23, 2023     (KR) ........................ 10-2023-0038051

(51) Int. Cl.
 *B60R 19/18*     (2006.01)
 *B60R 3/00*     (2006.01)
(52) U.S. Cl.
 CPC ................ *B60R 19/18* (2013.01); *B60R 3/00* (2013.01)

(58) Field of Classification Search
 CPC .................. B60R 19/18; B60R 19/023; B60R 2019/1886; B60R 2019/1806; B60R 3/00; B60R 3/002
 See application file for complete search history.

(56) References Cited

U.S. PATENT DOCUMENTS

| | | | |
|---|---|---|---|
| 9,932,005 B2 * | 4/2018 | Perucca | B60R 3/00 |
| 10,029,634 B1 * | 7/2018 | Diaz | B60R 19/24 |
| 11,351,942 B2 * | 6/2022 | Knutsen | B60R 19/48 |

* cited by examiner

*Primary Examiner* — John D Walters
(74) *Attorney, Agent, or Firm* — MORGAN, LEWIS & BOCKIUS LLP

(57)     ABSTRACT

A bumper frame for a vehicle includes a back beam extending in a width direction of the vehicle, a first step bracket disposed in a center region of one surface of the back beam and provided in a structure protruding from the back beam, a pair of second step brackets disposed in each side region of the one surface of the back beam and provided in structures protruding from the back beam in parallel with the first step bracket, and a support bracket fastened and fixed to the one surface of the back beam and configured to support a lower portion of each of the first step bracket and the second step brackets protruding from the back beam, and the support bracket is made of a hollow pipe member and formed in the shape of a circular or non-circular cross-section.

10 Claims, 9 Drawing Sheets

200

240:241, 242, 243

10

120:121, 122

BUMPER FRAME FOR VEHICLE AND BUMPER

CROSS-REFERENCE TO RELATED APPLICATION

This application claims priority to and the benefit of Korean Patent Application No. 10-2023-0038051, filed on Mar. 23, 2023, in the Korean Intellectual Property Office, the disclosure of which is incorporated herein by reference in its entirety.

BACKGROUND

1. Field of the Invention

The present disclosure relates to a bumper frame for a vehicle and a bumper of the vehicle including the bumper frame.

2. Discussion of Related Art

A rear bumper of a pickup truck is configured so that a frame structure generally made of a steel material is covered and hidden under a cover, and the cover has a step provided as a stepping tool to enable an occupant to step on it for easy mounting.

A frame supporting such a step should be designed to sufficiently support a force applied to the step, but there are limitations to implement various designs because of limitations on the steel press molding, and when performance is not satisfactory, a mold should be newly designed, which increases cost.

Therefore, the improvement thereof is required.

SUMMARY OF THE INVENTION

The present disclosure is directed to providing a bumper frame for a vehicle capable of realizing weight reduction and more diverse design configurations and a bumper of the vehicle.

The objects of the present disclosure are not limited to the above-mentioned objects, and other objects not mentioned will be clearly understood by those skilled in the art from the following description.

According to an aspect of the present disclosure, there is provided a bumper frame for a vehicle, including: a back beam extending in a width direction of the vehicle; a first step bracket disposed in a center region of one surface of the back beam and provided in a structure protruding from the back beam; a pair of second step brackets disposed in each side region of the one surface of the back beam and provided in structures protruding from the back beam in parallel with the first step bracket; and a support bracket fastened and fixed to the one surface of the back beam and configured to support a lower portion of each of the first step bracket and the second step brackets protruding from the back beam, and the support bracket may be made of a hollow pipe member and formed in the shape of a circular or non-circular cross-section.

The support bracket may include a first body disposed spaced apart from the back beam, a pair of second bodies bent at both ends of the first body and extending toward the back beam, and a third body bent at an end of each of the pair of second bodies and extending in a vertical direction along the one surface of the back beam, and the support bracket may be configured to support the first step bracket and the second brackets through the second bodies and the first body in a state in which the third body is fixed to the one surface of the back beam.

The first body may be disposed in a first direction, the second bodies may be bent toward a second direction perpendicular to the first direction, and the third body may have a structure bent toward a third direction perpendicular to each of the first direction and the second direction.

In the center region of the back beam, the support bracket may be fixed so that an end of the third body faces an upper surface of the back beam, and disposed so that the first body and the second bodies are located below a lower surface of the back beam, and in the side regions of the back beam, the support bracket may be fixed so that the end of the third body faces the lower surface of the back beam, and disposed so that the first body and the second bodies are located above the upper surface of the back beam.

The first step bracket may include a vertical portion extending below the lower surface of the back beam along the one surface of the back beam and a horizontal portion bent at an end of the vertical portion and extending to an outer side of the back beam, the vertical portion may have an accommodation recess configured to accommodate the third body in a state in which an upper end is attached to the one surface of the back beam, and the horizontal portion may be supported with a lower surface being placed on the second bodies and the first body.

The second step brackets may be spaced apart from the back bream and supported with lower surfaces being placed on the second bodies and the first body.

The bumper frame may further include a reinforcing bracket having a structure bent along the second bodies and the third body and configured to support the second bodies and the third body in a state in which the reinforcing bracket is disposed in a rear side of the first step bracket and attached to the lower surface of the back beam and a lower surface of the first step bracket.

The first step bracket may be configured to be supported by a pair of support brackets with different sizes, and a fastening bracket configured to integrally fasten and fix a pair of first bodies may be further mounted on a lower surface of the first step bracket in a state in which the pair of first bodies are disposed parallel to each other on the lower portion of the first step bracket.

The bumper frame may further include a third step bracket disposed on each of both side surfaces of the back beam and provided in a structure protruding from the back beam, and the third step bracket may be configured to be supported by the support bracket fastened and fixed to each of the one surface of the back beam and the side surfaces of the back beam.

According to another aspect of the present disclosure, there is provided a bumper of a vehicle, including: a bumper frame mounted on a vehicle body; and a bumper cover accommodating the bumper frame therein, the bumper frame includes: a back beam extending in a width direction of the vehicle; a first step bracket disposed in a center region of the one surface of the back beam and provided in a structure protruding from the back beam; a pair of second step brackets disposed in each side region of the one surface of the back beam and provided in structures protruding from the back beam in parallel with the first step bracket; and a support bracket fastened and fixed to the one surface of the back beam and configured to support a lower portion of each of the first step bracket and the second step brackets protruding from the back beam, and the support bracket may be made of a hollow pipe member and formed in the shape of a circular or non-circular cross-section.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
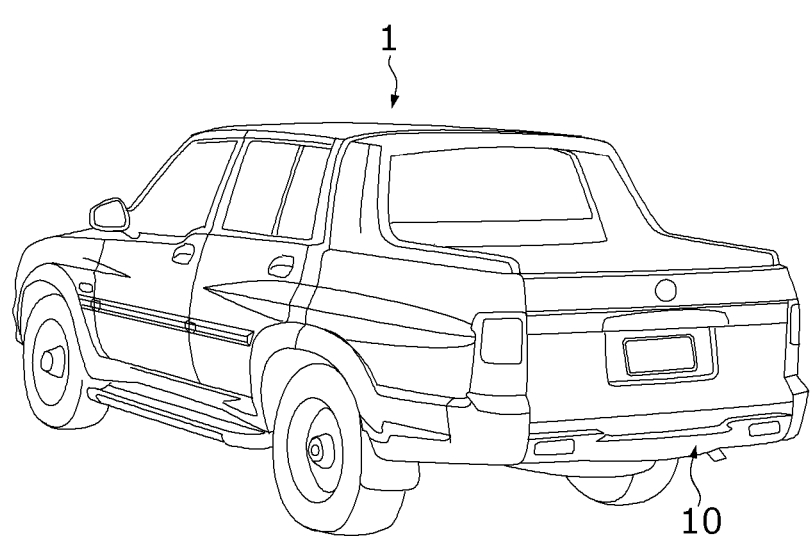
FIG. 1 is a view schematically illustrating a state in which a bumper according to an embodiment of the present disclosure is installed in a vehicle.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims.

Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, embodiments will be described in detail with reference to the accompanying drawings, but the same or corresponding components are assigned the same reference numbers even in different drawings and are not redundantly described herein.

Figure 2:
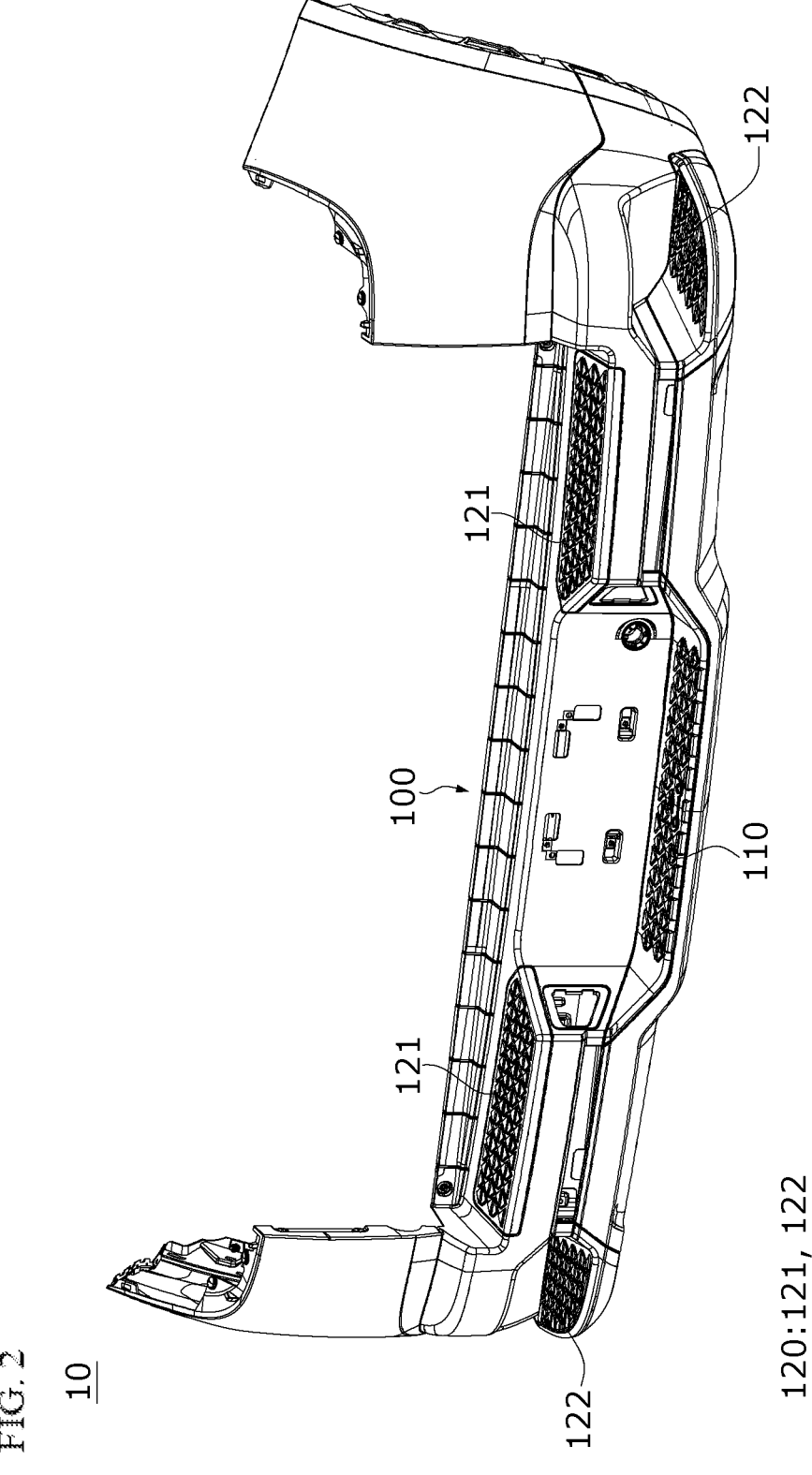
FIG. 2 is a perspective view schematically illustrating the bumper of a vehicle according to the embodiment of the present disclosure.
Figure 3:
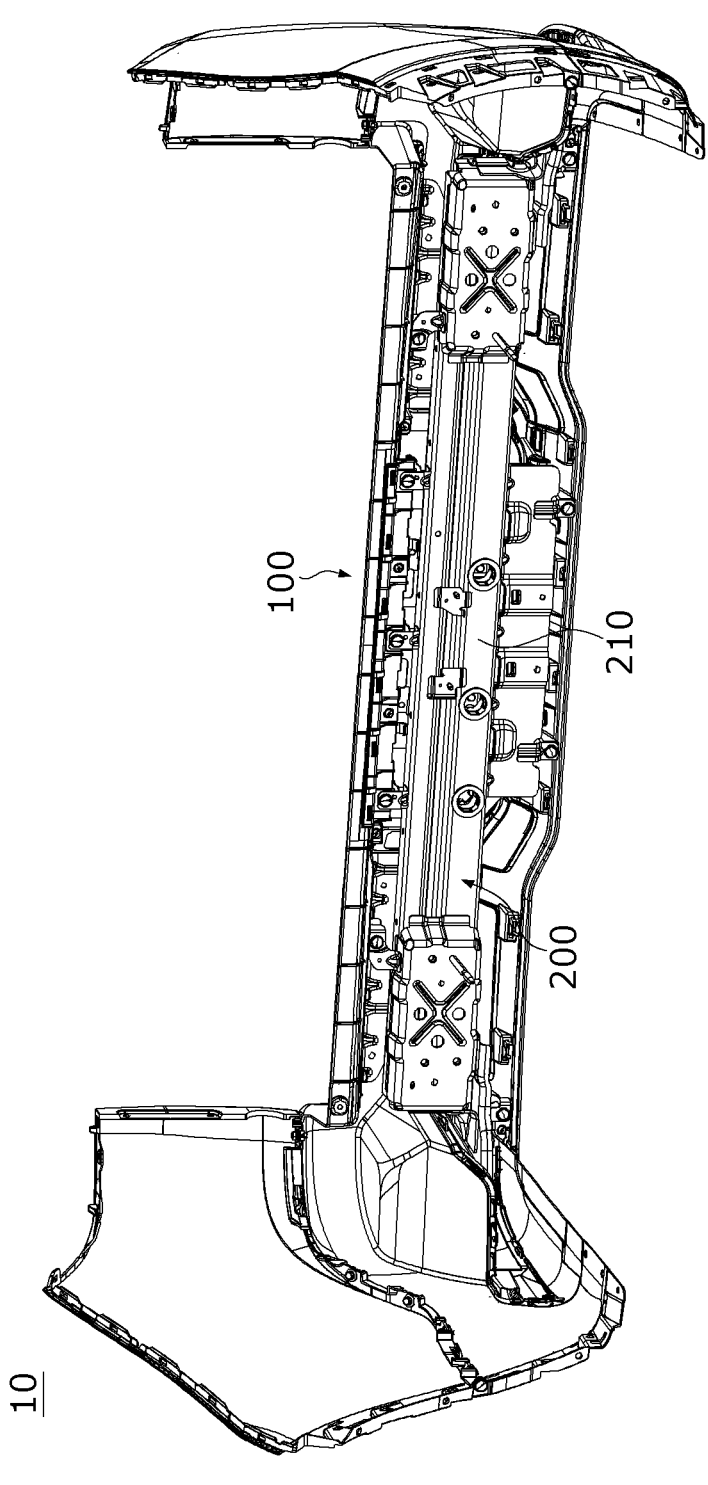
FIG. 3 is a rear view schematically illustrating the bumper of FIG. 2.
Figure 4:
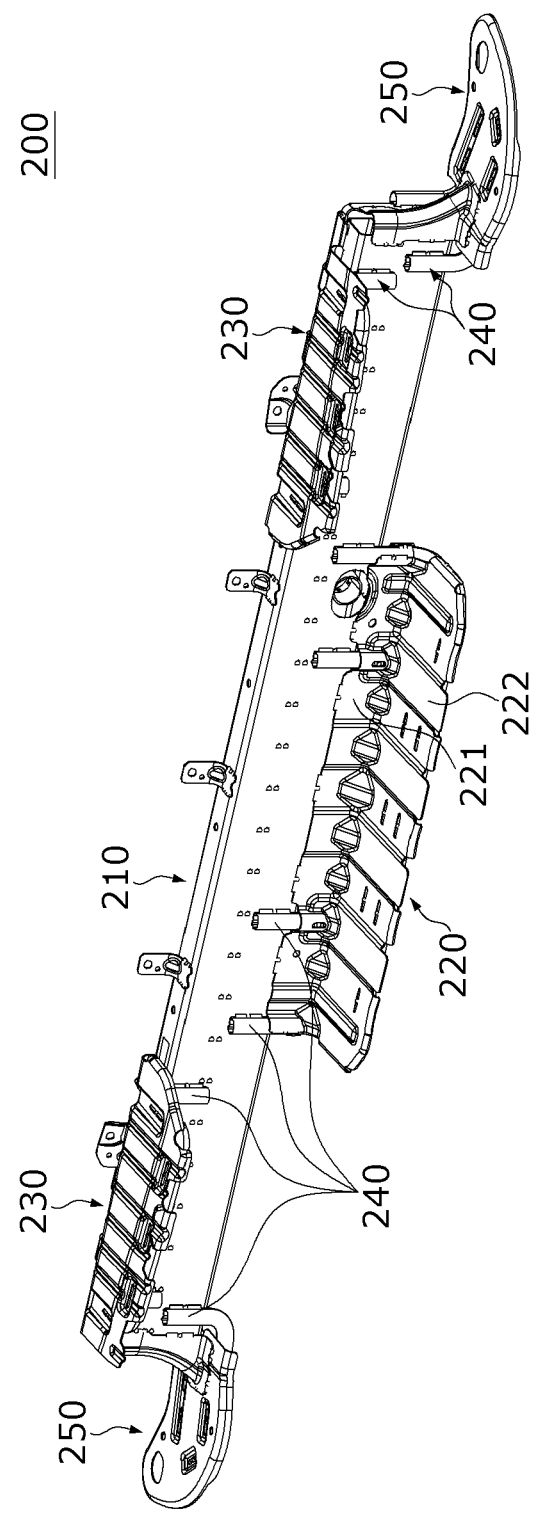
FIG. 4 is a perspective view schematically illustrating a bumper frame in the bumper of FIG. 3.
Figure 5:
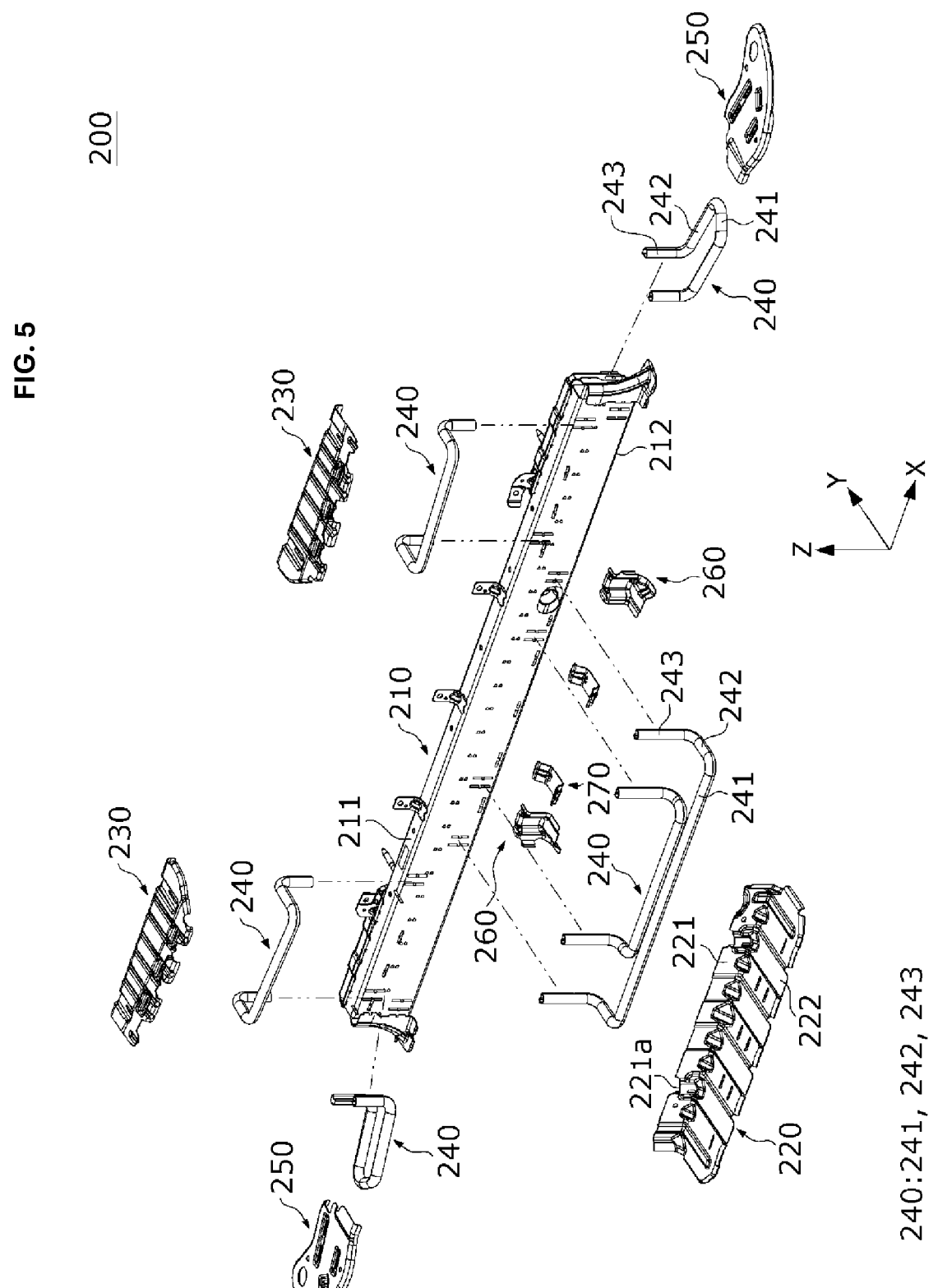
FIG. 5 is an exploded perspective view schematically illustrating the bumper frame of FIG. 4.
Figure 6:
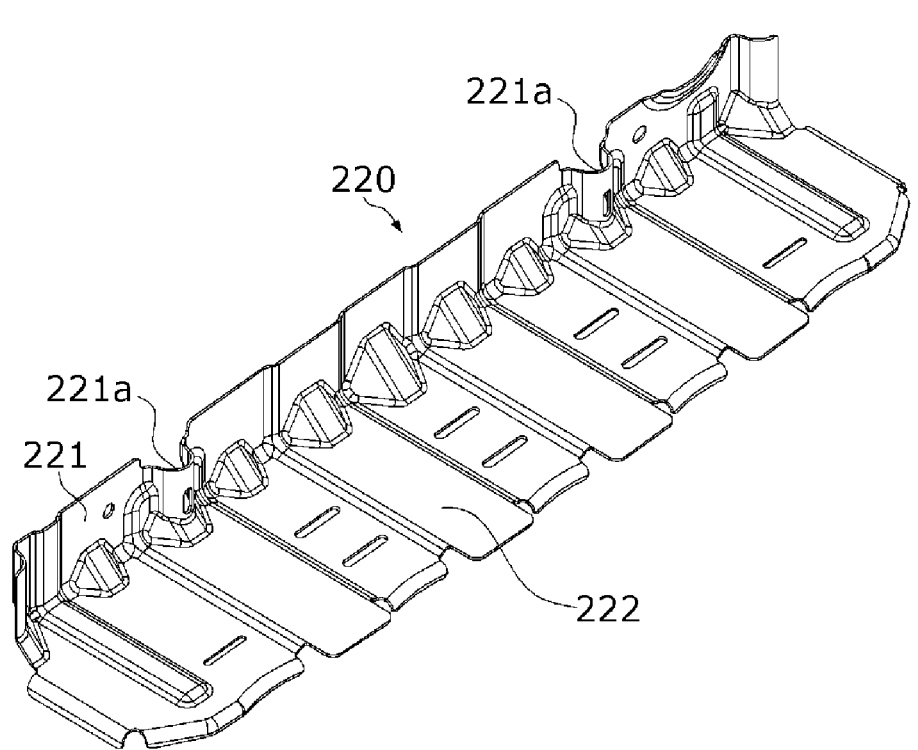
FIG. 6 is a perspective view schematically illustrating a first step bracket in the bumper frame of FIG. 5.
Figure 7:
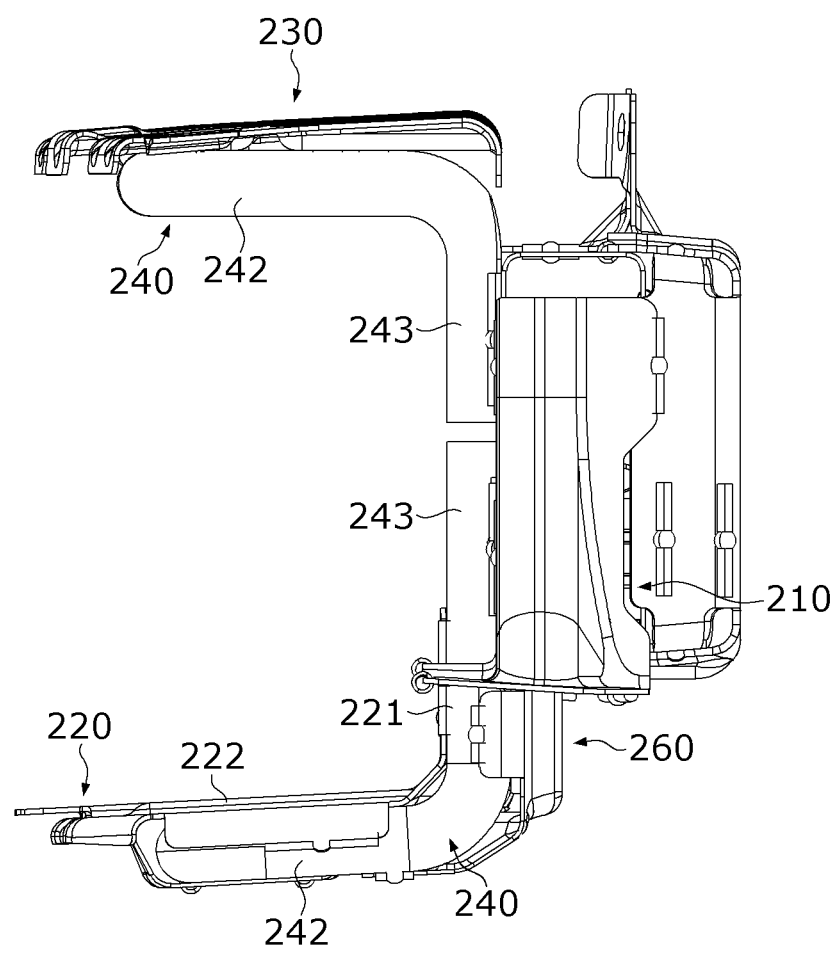
FIG. 7 is a side view schematically illustrating the bumper frame of FIG. 4.
Figure 8:
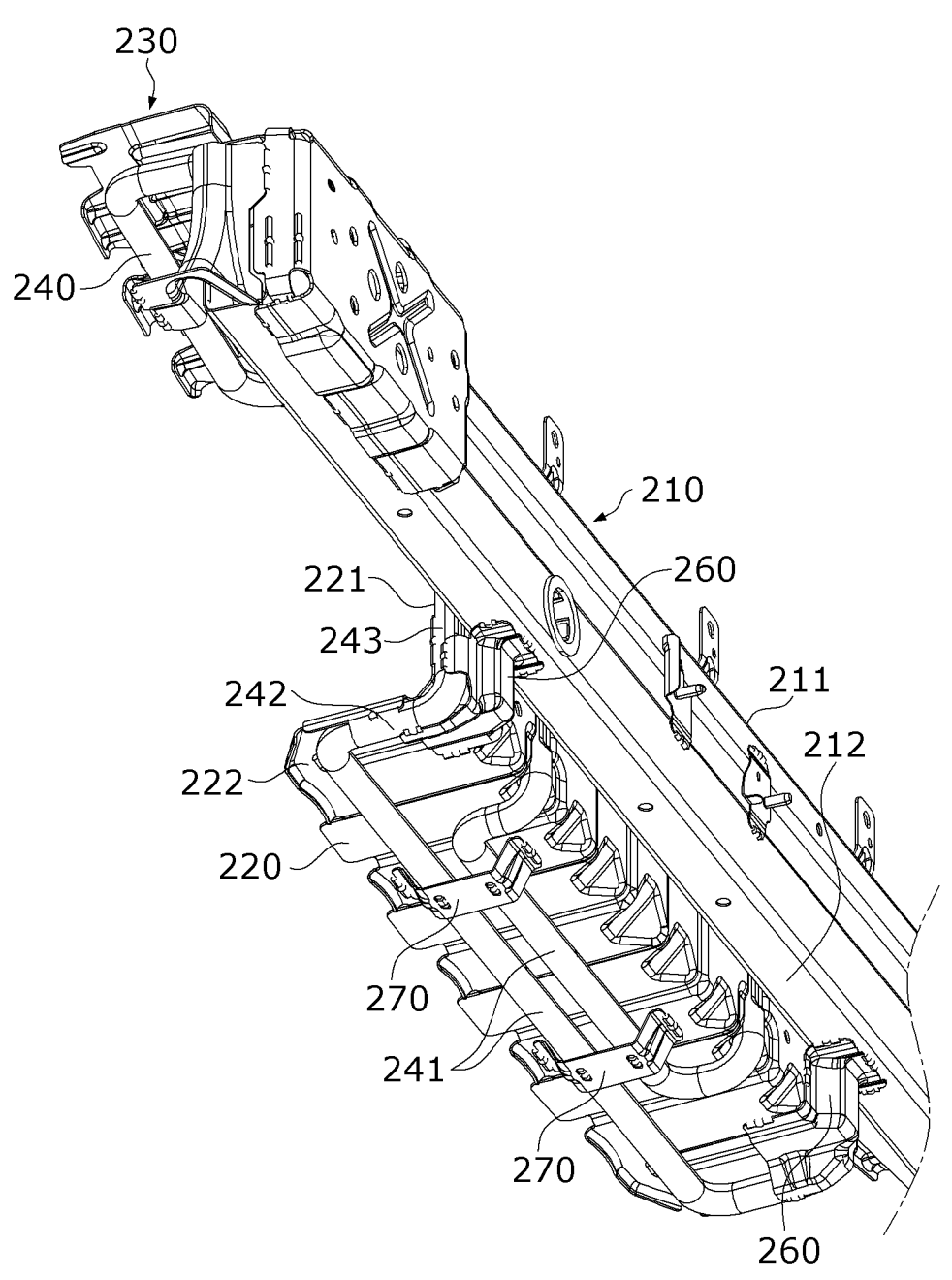
FIG. 8 is a bottom view schematically illustrating a state in which the first step bracket is supported by a support bracket in the bumper frame of FIG. 4.
Figure 9:
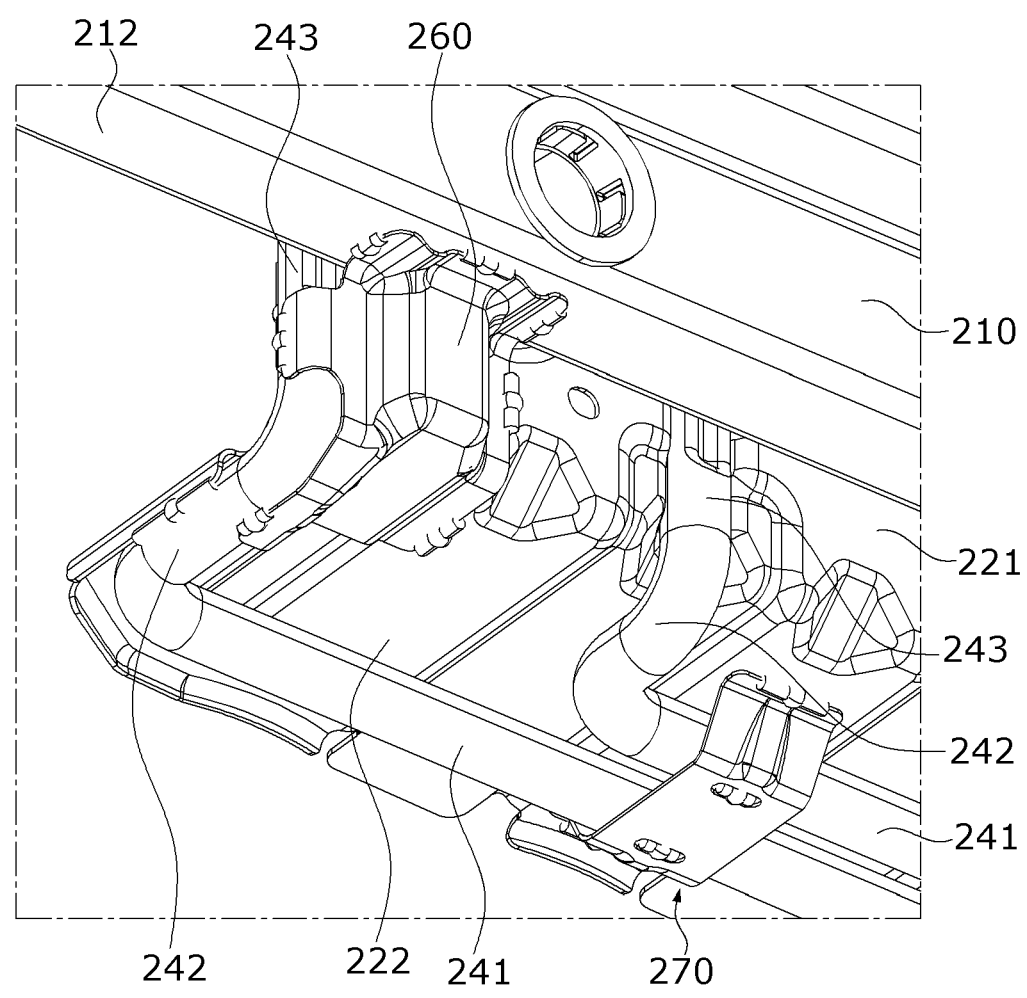
FIG. 9 is a bottom view schematically illustrating a state in which a reinforcing bracket and a fastening bracket are attached in the bumper frame of FIG. 8.

FIG. 1 is a view schematically illustrating a state in which a bumper according to an embodiment of the present disclosure is installed in a vehicle, FIG. 2 is a perspective view schematically illustrating the bumper of a vehicle according to the embodiment of the present disclosure, and FIG. 3 is a rear view schematically illustrating the bumper of FIG. 2. FIG. 4 is a perspective view schematically illustrating a bumper frame in the bumper of FIG. 3, FIG. 5 is an exploded perspective view schematically illustrating the bumper frame of FIG. 4, FIG. 6 is a perspective view schematically illustrating a first step bracket in the bumper frame of FIG. 5, and FIG. 7 is a side view schematically illustrating the bumper frame of FIG. 4. FIG. 8 is a bottom view schematically illustrating a state in which the first step bracket is supported by a support bracket in the bumper frame of FIG. 4, and FIG. 9 is a bottom view schematically illustrating a state in which a reinforcing bracket and a fastening bracket are attached in the bumper frame of FIG. 8.

As shown in FIG. 1, a bumper 10 of a vehicle according to an embodiment of the present disclosure is a device mounted to protect the front or back of a vehicle 1. Herein, the bumper 10 according to the embodiment of the present disclosure may be a rear bumper protecting a rear side of the vehicle 1 and may be mounted on a vehicle (for example, a pickup truck) with a cargo bed.

Referring to drawings, the bumper 10 of a vehicle according to the embodiment of the present disclosure may include a bumper cover 100 and a bumper frame 200.

The bumper cover 100 may be injection molded with a plastic material to implement various designs. Herein, it is preferable that the plastic strength of the bumper cover 100 is strong enough to pass a safety assessment in a crash performance test conducted for occupants' safety.

The bumper cover 100 may be configured to cover and accommodate the bumper frame 200 to prevent the bumper frame 200 from being exposed to the outside thereof.

The bumper cover 100 may have a center pedestal 110 and side pedestals 120.

Each of the center pedestal 110 and the side pedestals 120 corresponds to a section that a vehicle occupant actually steps on. That is, the occupant may get into a cargo bed or get off the cargo bed by stepping on the center pedestal 110 and the side pedestals 120.

The center pedestal 110 may be disposed in a center region of the bumper cover 100. In addition, the side pedestals 120 may be disposed in each side region at both left and right sides of the center pedestal 110. In the embodiment, the center pedestal 110 may be located in a lower portion of the center region of the bumper cover 100, and the side pedestals 120 may be located in an upper portion.

As shown in the drawings, the side pedestals 120 may include a pair of upper side pedestals 121 and a pair of lower side pedestals 122.

The upper side pedestals 121 may be disposed at both left and right sides of the center pedestal 110 with the center pedestal 110 therebetween. The lower side pedestals 122 may be disposed in both edge regions of the bumper cover 100 with the upper side pedestals 121 therebetween. In the embodiment, the upper side pedestals 121 may be located at an upper end of the bumper cover 100, and the lower side pedestals 122 may be located at a relatively lower portion.

The bumper frame 200 is configured to improve overall durability of the bumper 10 and thus may be installed on an inner side of the bumper cover 100 to be mounted on a vehicle body. In the embodiment, the bumper frame 200 may be made of steel materials capable of being mutually joined through welding.

Referring to FIGS. 4 and 5, the bumper frame 200 may include a back beam 210, a first step bracket 220, a second step bracket 230, and a support bracket 240. In addition, according to the embodiment, the bumper frame 200 may further include a third step bracket 250.

The back beam 210 is a structure forming the whole framework of the bumper frame 200 and may have a rod structure with a substantially rectangular shape extending in a width direction of the vehicle 1.

The first step bracket 220, the second step bracket 230, and the support bracket 240 may be disposed on one surface of the back beam 210 to be attached to the back beam 210. In addition, the other surface of the back beam 210 may be fixed to the vehicle body.

The first step bracket 220 may be disposed in a center region of one surface of the back beam 210 and provided in a structure protruding from the back beam 210. This first step bracket 220 may be configured to support and reinforce the center pedestal 110 below the center pedestal 110 of the bumper cover 100.

As shown in FIG. 6, the first step bracket 220 may include a vertical portion 221 extending along the one surface of the back beam and below a lower surface of the back beam 210 and a horizontal portion 222 bent at an end of the vertical portion 221 and extending to an outer side of the back beam 210 and have a structure bent in an overall "L" shape. The vertical portion 221 may have an accommodation recess 221a accommodating the support bracket 240 to be described below.

The second step bracket 230 may be disposed in pair in each side region of one surface of the back beam 210 and provided in a structure protruding from the back beam 210 in parallel with the first step bracket 220. These second step brackets 230 may be configured to support and reinforce the side pedestals 120 below the side pedestals 120 of the bumper cover 100. In this case, the side pedestals 120 may be the upper side pedestals 121.

The second step bracket 230 may be formed in an overall flat plate shape and have an inverted "L"-shaped structure with a rear end portion bent downward.

In the embodiment, the first step bracket 220 and the second step bracket 230 may be fabricated by press-molding a flat steel plate through a mold.

The first step bracket 220 and the second step bracket 230 may be fixed to the back beam 210 through the support bracket 240.

The support bracket 240 may be fastened and fixed to one surface of the back beam 210 and configured to support a lower portion of each of the first step bracket 220 and the second step bracket 230 protruding from the back beam 210.

As shown in the drawings, the support bracket 240 may include a first body 241 disposed spaced apart from the back beam 210, a pair of second bodies 242 bent at both ends of the first body 241 and extending toward the back beam 210, and a third body 243 bent at an end of each of the pair of second bodies 242 and extending in a vertical direction along one surface of the back beam 210.

This support bracket 240 may be configured to be fastened to and support each of the first step bracket 220 and the second step bracket 230 through the second bodies 242 and the first body 241 in a state in which the third body 243 is attached and fixed to one surface of the back beam 210.

In the embodiment, the support bracket 240 may be made of a hollow pipe member and formed in the shape of a circular or non-circular cross-section. In addition, the support bracket 240 may be formed by bending a single pipe member extending lengthwise in a longitudinal direction in a predetermined direction through a bending machine.

Specifically, the support bracket 240 may have a structure in which the first body 241 is disposed in a first direction, the second bodies 242 are bent toward a second direction perpendicular to the first direction, and the third body 243 is bent toward a third direction perpendicular to each of the first direction and the second direction. Herein, the first direction may correspond to a direction parallel to the back beam 210, that is, an X-axis direction, the second direction may correspond to a Y-axis direction, and the third direction may correspond to a Z-axis direction. Thus, a fabricating process is simple because the support bracket 240 can be formed through two bending processes, and the effect of cost reduction can be expected because no separate mold needs to be fabricated.

In the center region of the back beam 210, the support bracket 240 may be fixed so that an end of the third body 243 faces an upper surface 211 of the back beam 210, and disposed so that the first body 241 and the second bodies 242 are located below a lower surface 212 of the back beam 210. Accordingly, the support bracket 240 may be attached and fixed in an "L" shape to the center region of one surface of the back beam 210 in a state in which the second bodies 242 and the first body 241 are located at a level lower than the lower surface 212 of the back beam 210.

The support bracket 240 fixed to the center region of the back beam 210 may support the first step bracket 220. Specifically, as the vertical portion 221 of the first step bracket 220 has the accommodation recess 221a accommodating the third body 243 while an upper end of the vertical portion 221 is welded and attached to one surface of the back beam 210, the vertical portion 221 may be attached to the back beam 210 and the third body 243 while being in close contact with one surface of the back beam 210. In addition, the horizontal portion 222 of the first step bracket 220 may be supported as a lower surface thereof is placed on and attached to the second bodies 242 and the first body 241.

Meanwhile, as the first step bracket 220 is frequently stepped on, a relatively stronger force is applied to the first step bracket 220, and thus a reinforcing bracket 260 may be further provided to reinforce the support bracket 240 supporting the first step bracket 220.

As shown in FIGS. 7 to 9, the reinforcing bracket 260 may be disposed at the rear of the first step bracket 220. This reinforcing bracket 260 may have a structure bent along the second bodies 242 and the third body 243 and may be configured to support the second bodies 242 and the third body 243 while being attached and fixed to the lower surface of the back beam 210 and the lower surface of the horizontal portion 222 of the first step bracket 220. In this case, the reinforcing bracket 260 may be attached to each of the third body 243 and the second bodies 242 through welding.

In addition, the first step bracket 220 may be configured to be supported by a pair of support brackets 240 with different sizes. That is, the pair of support brackets 240 with different lengths of the first body 241 and the second bodies 242 may be doubly disposed to support the first step bracket 220.

As shown in the drawings, the support bracket 240 with relatively short lengths of the first body 241 and the second bodies 242 is disposed at an inner side of the support bracket 240 with relatively long lengths of the first body 241 and the second bodies 242.

In addition, a fastening bracket 270 configured to integrally fasten and fix a pair of first bodies 241 may be mounted on the lower surface of the first step bracket 220 in a state in which the pair of first bodies 241 are disposed parallel to each other on the lower portion of the first step bracket 220.

The fastening bracket 270 has a structure bent in an approximate "U" shape, both upper end portions thereof are welded and fastened to the lower surface of the horizontal portion 222 of the first step bracket 220 and the pair of first bodies 241 may be accommodated and fastened. The fastening bracket 270 and the first bodies 241 may also be welded and fastened to each other.

In the present embodiment, the first step bracket 220 is exemplified to be supported by the pair of support brackets 240 but is not limited thereto. For example, a single support bracket 240 may also be configured to support the first step bracket 220. In addition, three or more support brackets 240 may also be configured to support the first step bracket 220.

In each of the side regions of the back beam 210, the support bracket 240 may be fixed so that an end of the third body 243 faces the lower surface 212 of the back beam 210, and disposed so that the first body 241 and the second bodies 242 are located above the upper surface 211 of the back beam 210. Accordingly, the support bracket 240 may be attached and fixed in an inverted "L" shape to each of the side regions of one surface of the back beam 210 in a state in which the second bodies 242 and the first body 241 are located at a level higher than the upper surface of the back beam 210.

The support bracket 240 fixed to each of the side regions of the back beam 210 may support the second step bracket 230. Specifically, the second step bracket 230 may be spaced apart from the back beam 210 and may be supported as its lower surface is placed on the second bodies 242 and the first body 241 and attached thereto through welding.

Meanwhile, the third step bracket 250 may be disposed on each of both side surfaces of the back beam 210 and provided in a structure protruding from the back beam 210 to the outer side.

This third step bracket 250 may be configured to support and reinforce the side pedestals 120 below the side pedestals 120 of the bumper cover 100. In this case, the side pedestals 120 may be the lower side pedestals 122.

The third step bracket 250 may be formed in an overall flat plate shape. In addition, the third step bracket 250 may be fabricated by press-molding a flat steel plate through a mold.

The third step bracket 250 may be fixed to the back beam 210 through the support bracket 240.

The support bracket 240 may be fixed when the third body 243 is fastened to each of one surface of the back beam 210 and the side surface of the back beam 210, and supported in a state in which the lower surface of the third step bracket 250 is placed on and fastened to the second bodies 242 and the first body 241 protruding from the back beam 210.

As described above, the bumper 10 of a vehicle according to the embodiment of the present disclosure is configured so that the bumper frame 200 constituting an inner framework has the first step bracket 220, the second step bracket 230, and the third step bracket 250 serving as supports for an occupant to step on, and thus has a structure suitable for a rear bumper of the vehicle 1 with a cargo bed such as a pickup truck.

Particularly, the first step bracket 220, the second step bracket 230, and the third step bracket 250, which correspond to parts that an occupant steps on, are supported by the support bracket 240, and as this support bracket 240 is made of a hollow pipe member, the weight thereof may be minimized to realize weight reduction, and load bearing efficiency with respect to weight may be maximized.

In addition, there are advantages in that no separate mold for modifying a design of the support bracket 240 needs to be fabricated when the bearing capacity performance of the support bracket 240 is not sufficient or the designs of the first to third step brackets 220, 230 and 250 are modified, and no cost is required for separate facility investment because a design modification is possible through an existing bending machine.

According to an embodiment of the present disclosure, a bumper frame for a vehicle capable of realizing weight reduction and more diverse design configurations and a bumper of the vehicle can be provided.

The effects of the present disclosure are not limited to the above-mentioned effects, and other effects not mentioned will be clearly understood by those skilled in the art from the appended claims.

Although the present disclosure has been described above with reference to embodiments, it will be understood that those skilled in the art can make various changes and alterations without departing from the idea and scope of the present disclosure as defined by the appended claims. In addition, it will be interpreted that differences related to the changes and alterations fall within the scope of the present disclosure defined by the appended claims.

What is claimed is:

1. A bumper frame for a vehicle, comprising:
a back beam extending in a width direction of the vehicle;
a first step bracket disposed in a center region of one surface of the back beam and provided in a structure protruding from the back beam;
a pair of second step brackets disposed in each side region of the one surface of the back beam and provided as structures protruding from the back beam in parallel with the first step bracket; and
a plurality of support brackets fastened and fixed to the one surface of the back beam, a first support bracket of the plurality of support brackets configured to support a lower portion of the first step bracket, and second support brackets of the plurality of support brackets configured to support a lower portion of the second step brackets,
wherein each of the plurality of support brackets is made of a hollow pipe member and formed in a shape of a circular or non-circular cross-section.

2. The bumper frame of claim 1, wherein each of the plurality of support brackets includes:
a first body disposed spaced apart from the back beam;
a pair of second bodies bent at both ends of the first body and extending toward the back beam; and
a third body bent at an end of each of the pair of second bodies and extending in a vertical direction along the one surface of the back beam, and
the first support bracket is configured to support the first step bracket through second bodies of the first support bracket and a first body of the first support bracket in a state in which a third body of the first support bracket is fixed to the one surface of the back beam,
the second support brackets are configured to support the second step brackets through second bodies of the second support brackets and first bodies of the second support brackets in a state in which third bodies of the second support brackets are fixed to the one surface of the back beam.

3. The bumper frame of claim 2, wherein the first body is disposed in a first direction, the second bodies are bent toward a second direction perpendicular to the first direction, and the third body has a structure bent toward a third direction perpendicular to each of the first direction and the second direction.

4. The bumper frame of claim 2, wherein, in the center region of the one surface of the back beam, the first support bracket is fixed so that an end of the third body of the first support bracket faces an upper surface of the back beam, and disposed so that the first body of the first support bracket and the second bodies of the first support bracket are located below a lower surface of the back beam, and
in the side regions of the one surface of the back beam, the second support brackets are fixed so that the end of the third bodies of the second support brackets faces the lower surface of the back beam, and disposed so that the first bodies and the second bodies of the second support brackets are located above the upper surface of the back beam.

5. The bumper frame of claim 2, wherein the first step bracket includes:

a vertical portion extending below the lower surface of the back beam along the one surface of the back beam; and
a horizontal portion bent at an end of the vertical portion and extending to an outer side of the back beam,
the vertical portion has an accommodation recess configured to accommodate the third body in a state in which an upper end is attached to the one surface of the back beam, and
the horizontal portion is supported with a lower surface being placed on the second bodies and the first body.

6. The bumper frame of claim 2, wherein the second step brackets are spaced apart from the back bream and supported with lower surfaces being placed on the second bodies and the first body.

7. The bumper frame of claim 2, further comprising: a reinforcing bracket having a structure bent along the second bodies and the third body and configured to support the second bodies and the third body in a state in which the reinforcing bracket is disposed in a rear side of the first step bracket and attached to the lower surface of the back beam and a lower surface of the first step bracket.

8. The bumper frame of claim 2, wherein the first support bracket comprises a pair of support brackets, and the first step bracket is configured to be supported by
a fastening bracket configured to integrally fasten and fix a pair of first bodies of the pair of support brackets is further mounted on a lower surface of the first step bracket in a state in which the pair of first bodies of the pair of support brackets are disposed parallel to each other on the lower portion of the first step bracket.

9. The bumper frame of claim 1, further comprising a third step bracket disposed on each of both side surfaces of the back beam and provided in a structure protruding from the back beam,
wherein the third step bracket is configured to be supported by a third support bracket of the plurality of support brackets fastened and fixed to each of the one surface of the back beam and the side surfaces of the back beam.

10. A bumper of a vehicle, comprising:
a bumper frame mounted on a vehicle body; and
a bumper cover accommodating the bumper frame therein,
wherein the bumper frame includes: a back beam extending in a width direction of the vehicle;
a first step bracket disposed in a center region of one surface of the back beam and provided in a structure protruding from the back beam;
a pair of second step brackets disposed in each side region of the one surface of the back beam and provided in structures protruding from the back beam in parallel with the first step bracket; and
a plurality of support brackets fastened and fixed to the one surface of the back beam, a first support bracket of the plurality of support brackets configured to support a lower portion of the first step bracket, and second support brackets of the plurality of support brackets configured to support a lower portion of the second step brackets protruding from the back beam, and
each of the plurality of support brackets is made of a hollow pipe member and formed in a shape of a circular or non-circular cross-section.

* * * * *